US012011940B2

(12) United States Patent
Sanada et al.

(10) Patent No.: US 12,011,940 B2
(45) Date of Patent: Jun. 18, 2024

(54) LABEL PRINTER

(71) Applicant: TOSHIBA TEC KABUSHIKI KAISHA, Tokyo (JP)

(72) Inventors: Tsuyoshi Sanada, Susono Shizuoka (JP); Yuji Kawamorita, Mishima Shizuoka (JP); Yuki Takagi, Mishima Shizuoka (JP); Shinya Hori, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 200 days.

(21) Appl. No.: 17/583,427

(22) Filed: Jan. 25, 2022

(65) Prior Publication Data

US 2022/0297445 A1 Sep. 22, 2022

(30) Foreign Application Priority Data

Mar. 22, 2021 (JP) ................................ 2021-047986

(51) Int. Cl.
*B41J 3/407* (2006.01)

(52) U.S. Cl.
CPC .................................. *B41J 3/4075* (2013.01)

(58) Field of Classification Search
CPC ................................ B41J 3/4075; B41J 11/42
See application file for complete search history.

(56) References Cited

U.S. PATENT DOCUMENTS

2013/0084121 A1 4/2013 Watanabe
2019/0217638 A1* 7/2019 Kanda .................... B41J 11/009
2019/0240998 A1* 8/2019 Tsuchiya .................... B41J 2/32

* cited by examiner

*Primary Examiner* — Jason S Uhlenhake
(74) *Attorney, Agent, or Firm* — Amin, Turocy & Watson, LLP

(57) ABSTRACT

A label printer includes an under cover, a top cover, a label peel-off unit, an interfering member supporting member, an interfering member, and an interfered member. The top cover moves between a first position where the top cover is opened and a second position where the top cover is closed with respect to the under cover. The label peel-off unit moves between a third position where the label peel-off unit is opened and a fourth position where the label peel-off unit is closed with respect to the under cover. The interfering member abuts against an exterior member of the label peel-off unit. The interfered member is a part of the exterior member of the label peel-off unit, and protrudes toward an upstream side in the label conveyance direction and is at a position where the interfered member abuts against the interfering member.

20 Claims, 9 Drawing Sheets

LABEL PRINTER

CROSS-REFERENCE TO RELATED APPLICATION

This application is based upon and claims the benefit of priority from Japanese Patent Application No. 2021-047986, filed on Mar. 22, 2021, the entire contents of which are incorporated herein by reference.

FIELD

Embodiments described herein relate generally to a label printer.

BACKGROUND

In the related art, a label printer is known to print information on a printing surface of a label of a label continuous body wound in a roll, peel the printed label from a liner, and dispense the printed label.

In such a label printer, when the printed label is to be dispensed in a peeled-off state, a label peel-off unit that pulls the label to bend the liner is provided in a state of being openable and closable on a part of a front cover of the label printer.

In order to appropriately peel off a label from the liner in such a label printer, a label printer is present in which a top cover for pressing a label during printing and a label peel-off unit for pulling the label to peel off the label from the liner are required to be closed in an appropriate order.

If a closing order in such a label printer is incorrect, the label is not appropriately peeled off due to the fact that the label is not placed at an appropriate position, which may cause a conveyance failure. Therefore, if a printing operation is performed without noticing that an incorrect closing order is used, a conveyance failure in which a label is not appropriately peeled off may occur as well.

DETAILED DESCRIPTION

In general, according to one embodiment, a label printer that reduces occurrence of conveyance failure caused by inappropriately peeling off a label even if an incorrect opening and closing order is used is provided.

In order to achieve the above action, the label printer according to an embodiment includes an under cover, a top cover, a label peel-off unit, an interfering member supporting member, an interfering member, and an interfered member. The under cover is a rectangular parallelepiped case in which a part of a front surface and an upper surface are opened, and protects a printer body. The top cover moves between a first position where the top cover is opened and a second position where the top cover is closed with respect to the under cover. The label peel-off unit is located downstream in a label conveyance direction in the under cover, and moves between a third position where the label peel-off unit is opened and a fourth position where the label peel-off unit is closed with respect to the under cover. The interfering member supporting member is provided in the top cover and is connected to the interfering member. The interfering member interferes with an exterior member of the label peel-off unit. The interfered member is a part of the exterior member of the label peel-off unit, and the interfered member protrudes toward an upstream side in the label conveyance direction and abuts against the interfering member when the top cover is located in the second position and the label peel-off unit is located in the fourth position.

Hereinafter, a label printer according to embodiments will be described with reference to the drawings.

First Embodiment

Figure 1:
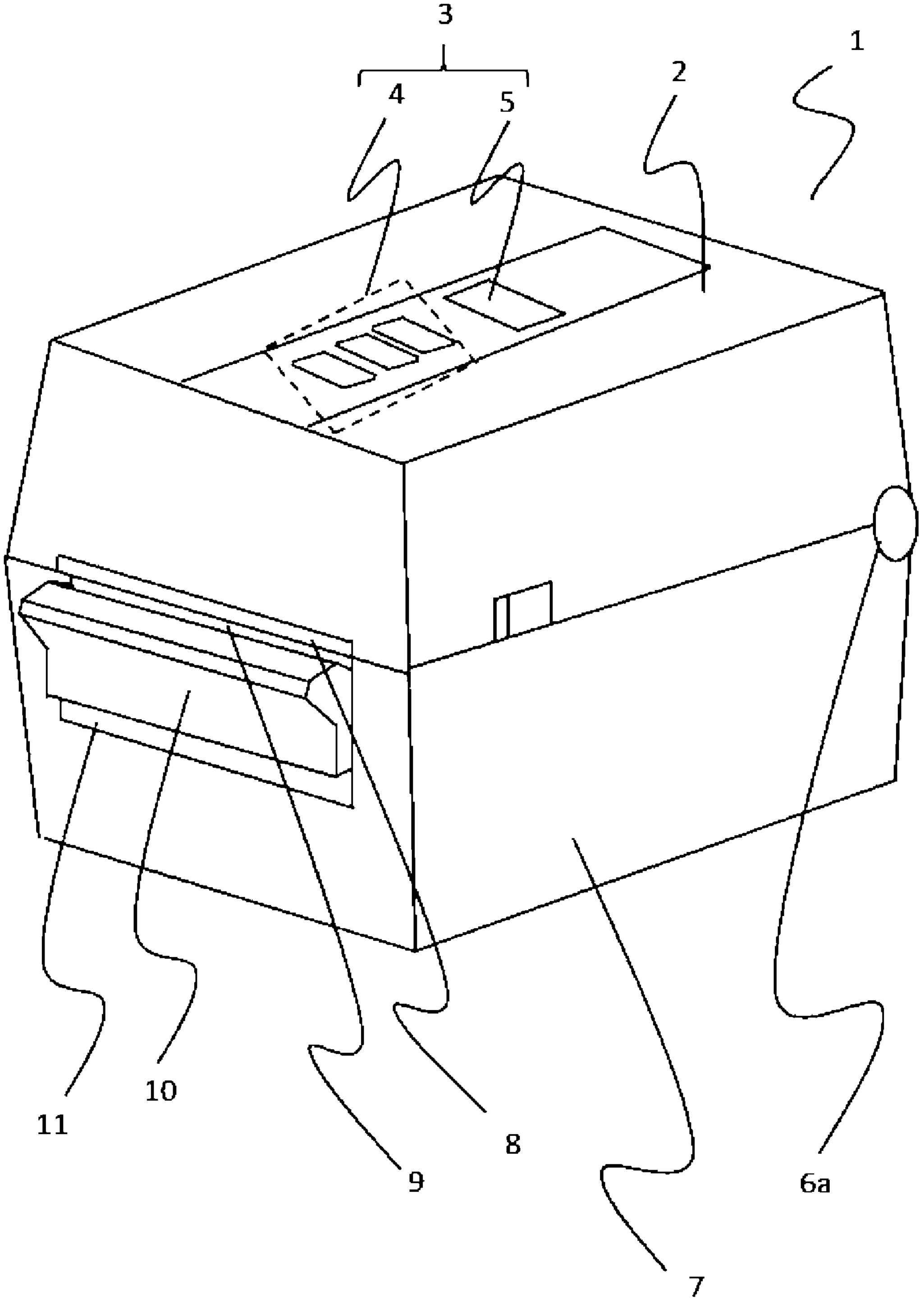
FIG. 1 is a perspective view illustrating a label printer according to a first embodiment.
Figure 2:
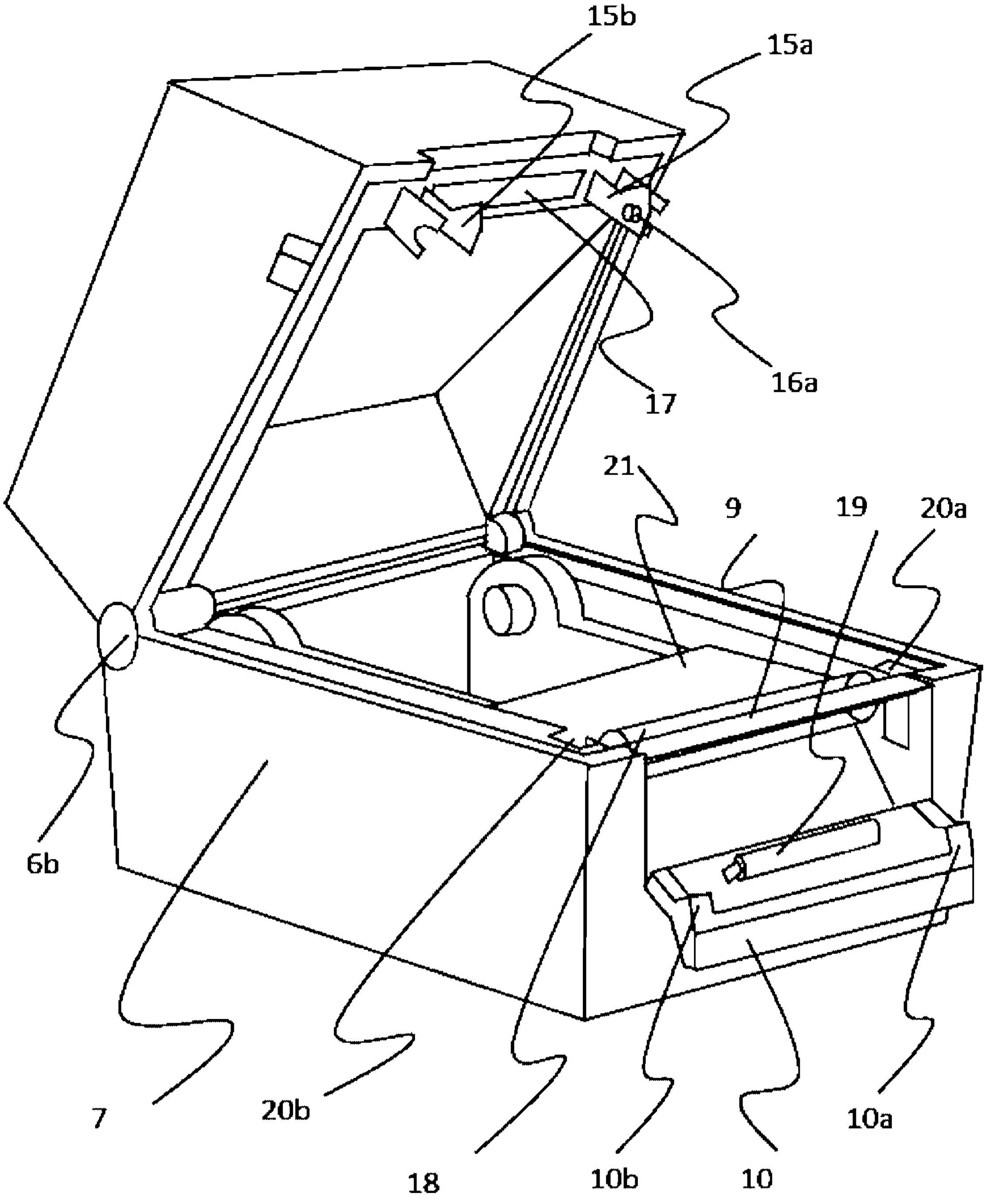
FIG. 2 is a perspective view illustrating a state in which a top cover and a label peel-off unit are opened.
Figure 3:
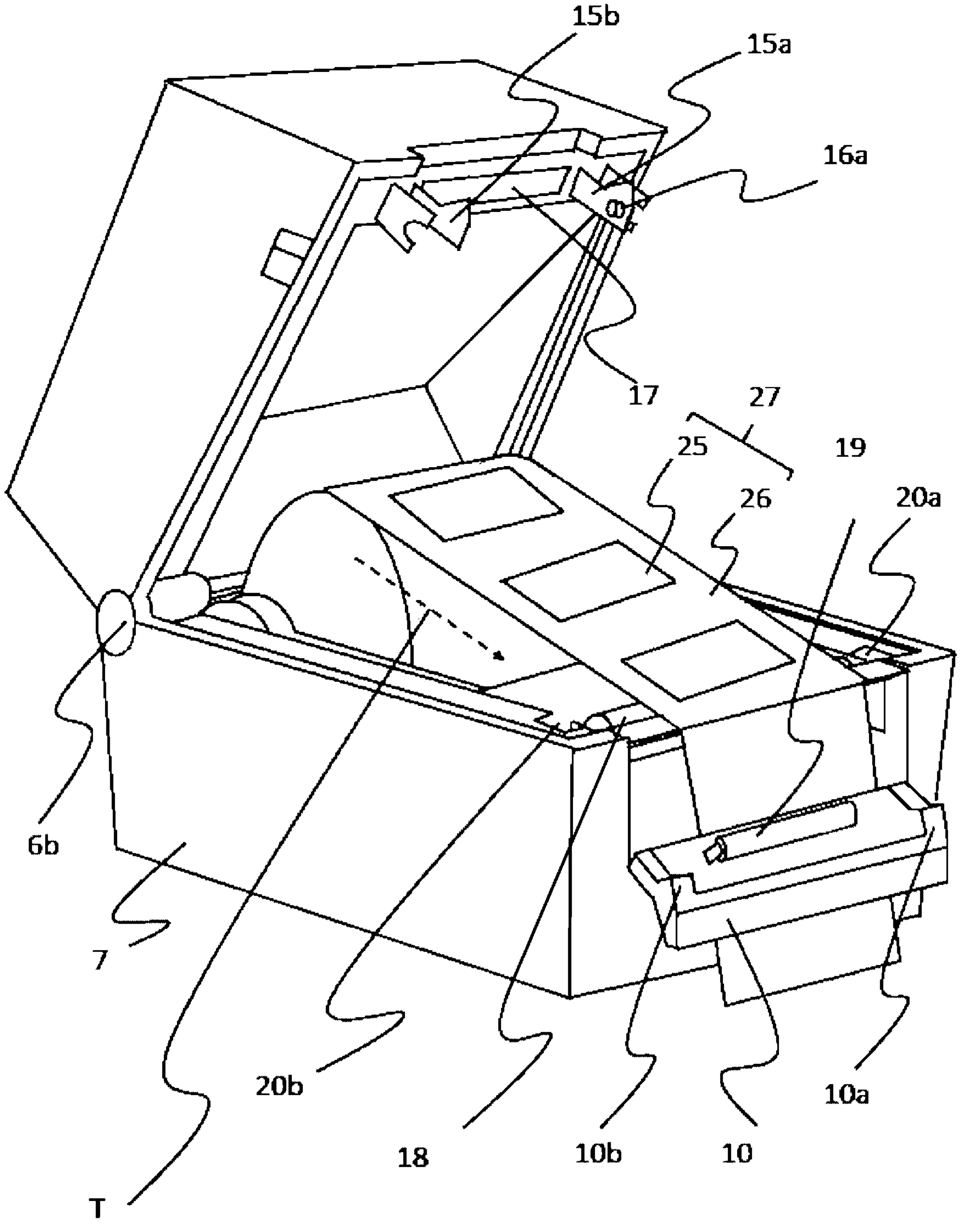
FIG. 3 is a perspective view illustrating a state in which a label continuous body is contained in the label printer.

FIG. 1 is a perspective view illustrating a label printer according to the first embodiment, FIG. 2 is a perspective view illustrating a state in which a top cover is opened, and FIG. 3 is a perspective view illustrating a state in which a label continuous body is contained in the label printer.

As illustrated in FIGS. 1 to 3, a label printer 1 according to the first embodiment mainly includes: a printer body 21, an under cover 7 that stores the printer body 21, a top cover 2 supported by a pivot supporting unit 6*a* and a pivot supporting unit 6*b* so as to be pivotable with respect to the printer body 21 and covers an upper portion of the printer body 21, and a label peel-off unit 10 supported by a pivot supporting unit (not illustrated) so as to be pivotable with respect to the printer body 21 and covers a front surface of the printer body 21. The printer body 21 is stored in a space formed by the top cover 2, the under cover 7, and the label peel-off unit 10. When the printer body 21 is stored in the space formed by the top cover 2, the under cover 7, and the label peel-off unit 10, a space is formed between the printer body 21 and the label peel-off unit 10 in a closed state and opens to a sheet discharge port 11.

Inside the printer body 21, a storage unit that stores a label continuous body 27 formed by a liner 26 and a label 25 peelably attached to the liner is provided on a rear end side of the printer body 21. The label continuous body 27 is conveyed toward a direction of a dashed arrow T (hereinafter, referred to as a label conveyance direction) illustrated in FIG. 3. A platen roller 18 and a peeling bar 9 are provided on a front end side of the printer body 21. The platen roller 18 is connected to a drive motor as a driving source (not illustrated) via a gear or the like. Further, opening portions 20*a* and 20*b* are provided at a front end portion of the printer body 21, and open to the space formed between the printer body 21 and the label peel-off unit 10 in the closed state, and to an upper surface of the printer body 21.

The under cover 7 is a rectangular parallelepiped case in which an upper surface and a part of a front surface are opened. The upper surface is closed by the top cover 2, and the front surface is closed by the label peel-off unit 10, thereby protecting the printer body 21 inside the under cover. The under cover 7 is provided with a connection terminal (not illustrated) or the like for supplying power to the printer body 21 inside the under cover.

The top cover 2 is movable between an open state (hereinafter referred to as a first position) in which the label continuous body 27 can be stored in the printer body 21 and a closed state (hereinafter referred to as a second position) in which printing can be performed on the label 25. The top cover 2 is provided with a control panel 3 including operation buttons 4 and a display unit 5. An operator can perform various operations using the operation buttons 4 and confirm various kinds of information on the display unit 5.

The top cover 2 includes a thermal head 17 and an interfering member supporting member 15. The thermal head 17 performs printing by sandwiching the label 25 between the thermal head 17 and the platen roller 18. An interfering member 16 interferes with the label peel-off unit 10 in a closed state. As illustrated in FIGS. 1 to 3, an interfering member 16*a* and an interfering member 16*b* are connected to an interfering member supporting member 15*a* and an interfering member supporting member 15*b*. When the top cover 2 is located at the secondposition, the interfering member supporting member 15*a* and the interfering member supporting member 15*b* are fitted into the opening portion 20*a* and the opening portion 20*b* provided at the front end portion of the printer body 21. The interfering member 16*a* and the interfering member 16*b* abut against a part of the label peel-off unit 10. The interfering member 16 is a protrusion, such as a boss, or a high friction member, and an abutment surface thereof is a curved surface or an inclined surface. The interfering members 16*a* and 16*b* are positioned in directions facing each other. Further, the interfering member 16 is located outside a sheet width of the liner 26. The interfering member supporting member 15 may be integrally molded with the interfering member 16 or may include a separate member.

When the top cover 2 is located at the second position, the interfering member 16*a* and the interfering member 16*b* are located in the space formed between the printer body 21 and the label peel-off unit 10 in a state closed from the opening portion 20*a* and the opening portion 20*b*.

The label peel-off unit 10 moves between a position where the label peel-off unit 10 is opened for inserting the liner 26 into the sheet discharge port 11 (hereinafter referred to as a third position) and a position where a nip roller 19 included in the label peel-off unit 10 abuts against the platen roller 18 and the label peel-off unit 10 is closed to sandwich the liner 26 (hereinafter, referred to as a fourth position). The label peel-off unit 10 includes the nip roller 19. When the label peel-off unit 10 is located at the fourth position, the nip roller 19 abuts against the platen roller 18, so that the label 25 is peeled off from the liner 26 while the liner 26 is conveyed to the sheet discharge port 11 after the label 25 is peeled off from the liner 26. A part of an exterior member of the label peel-off unit 10 that faces the printer body 21 includes an interfered member 10*a* and an interfered member 10*b* that abut against the interfering member supporting member 15. The interfered member 10*a* and the interfered member 10*b* are, for example, inclined surfaces, protrusions such as bosses, or the like. Further, the interfered member 10*a* and the interfered member 10*b* may be integrally formed with the label peel-off unit 10 or may include separate members.

The nip roller 19 is a driven roller without a driving source rotatably provided in the label peel-off unit 10. In a state in which the nip roller 19 is located at the fourth position, the liner 26 is pressed from a downstream side in the label conveyance direction as viewed from the peeling bar 9, thereby bent to an angle necessary for the peeling bar 9 to peel off the label 25 from the liner 26 while the liner 26 abuts against the peeling bar 9.

An interval is provided between an upper end portion of the label peel-off unit 10 and a lower portion of a front end of the top cover 2, and a label discharge port 8 that discharges a printed label 25 is provided in this interval.

The sheet discharge port 11 is provided at a lower portion of the label peel-off unit 10, and discharges the liner 26 from which the label 25 is peeled off by the peeling bar 9.

Then, operations of the interfering member 16 and the interfered members 10*a* and 10*b* will be described with reference to FIGS. 4 to 8.

Figure 4:
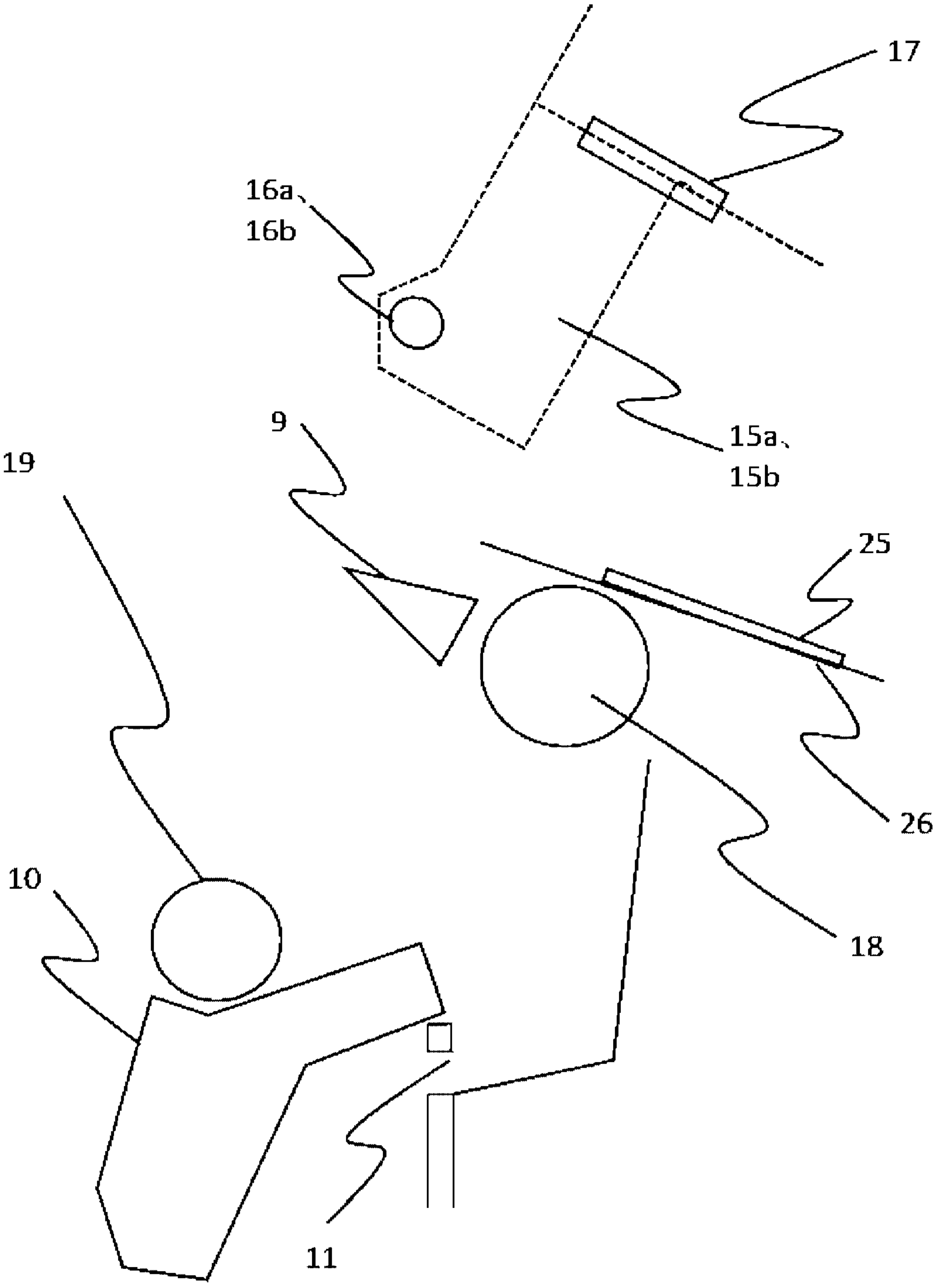
FIG. 4 is an enlarged view of a front end portion of the label printer in a state where both the top cover and the label peel-off unit are opened.
Figure 5:
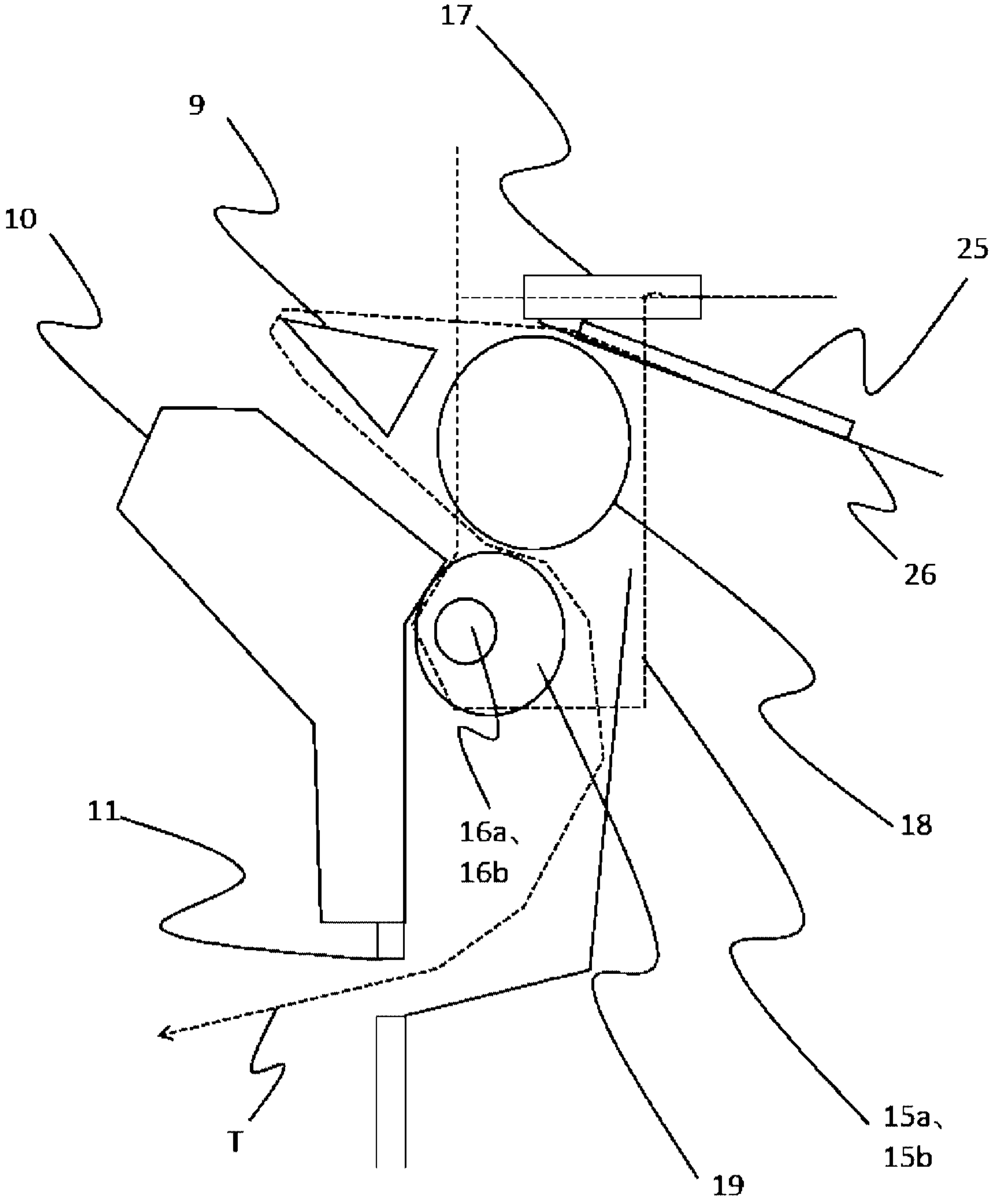
FIG. 5 is an enlarged view of the front end portion of the label printer in a state where the top cover and the label peel-off unit are closed.
Figure 6:
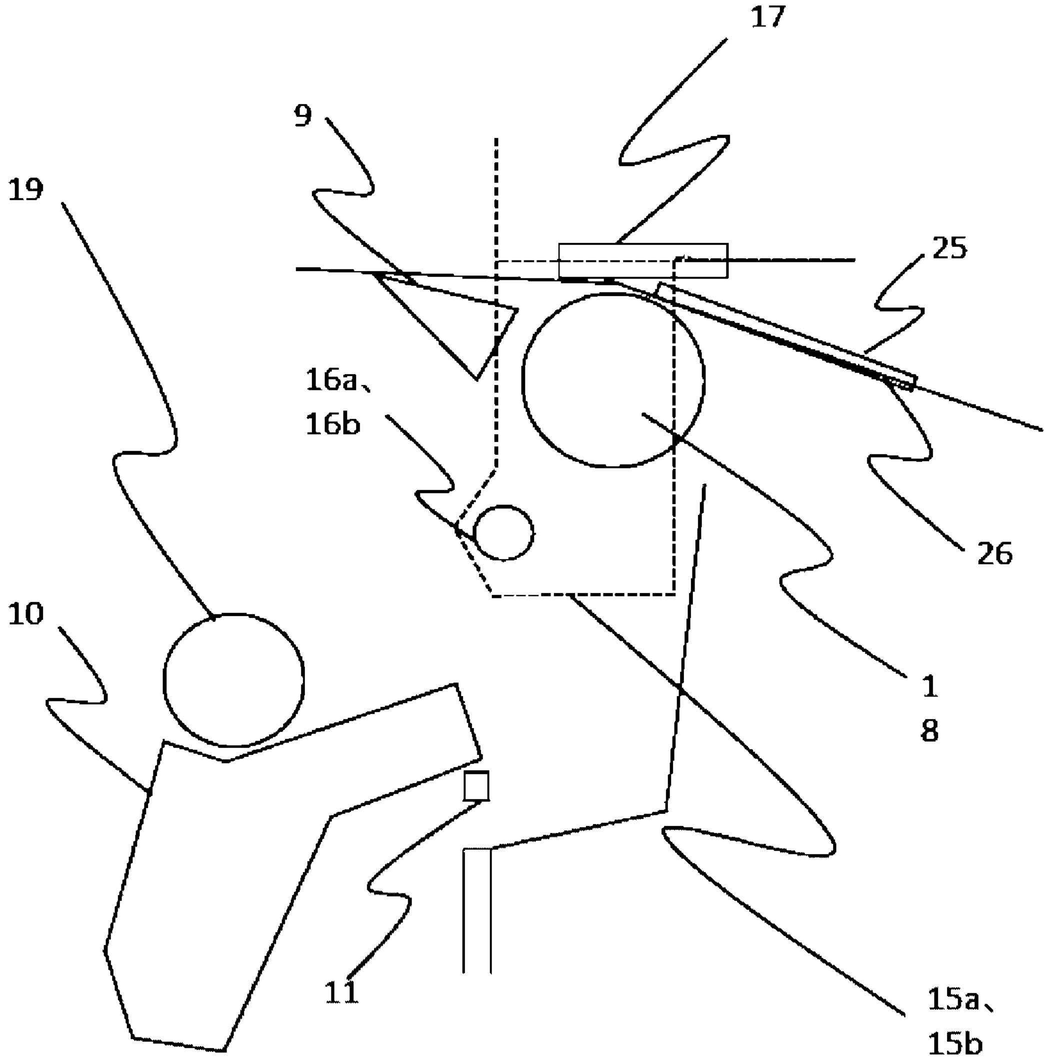
FIG. 6 is an enlarged view of the front end portion in a state where the top cover is first closed from the state in FIG. 4.
Figure 7:
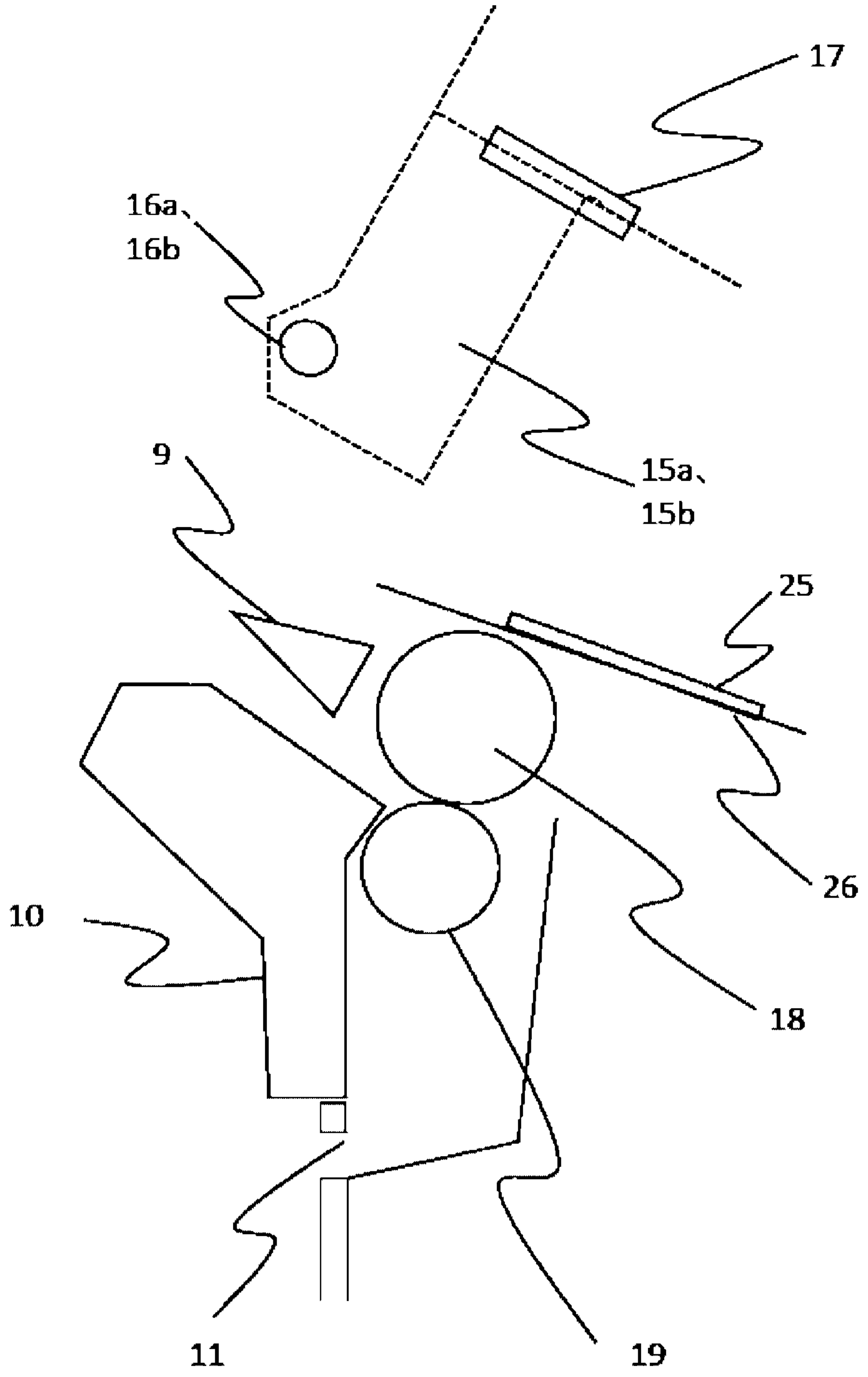
FIG. 7 is an enlarged view of the front end portion in a state where the label peel-off unit is first closed from the state in FIG. 4.
Figure 8:
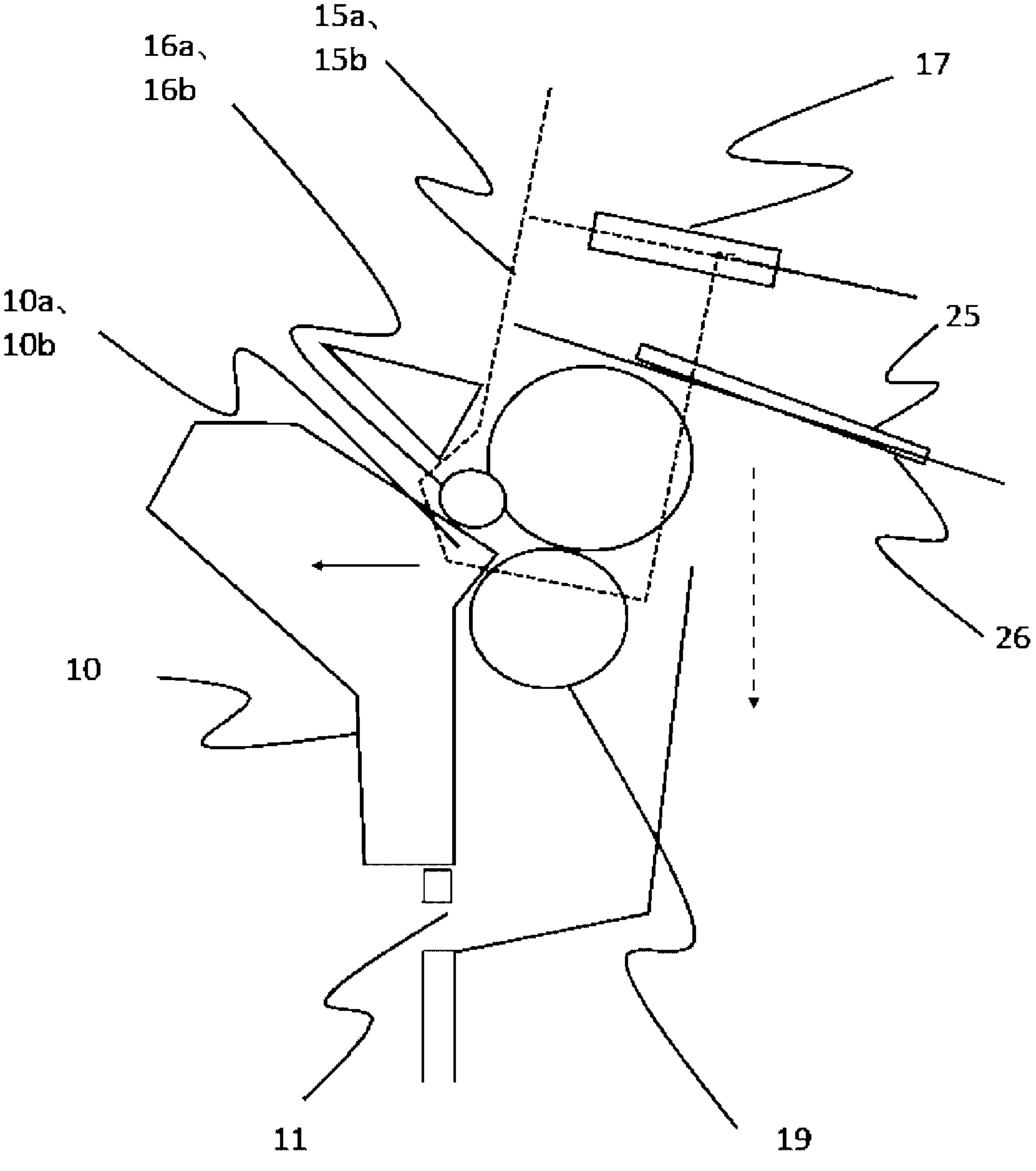
FIG. 8 is an enlarged view of the front end portion in a state where the top cover is moved from a state in FIG. 7 to a position at which the top cover abuts against the label peel-off unit.

FIG. 4 is an enlarged view of a front end portion of the label printer in a state where both the top cover and the label peel-off unit are opened. FIG. 5 is an enlarged view of the front end portion in a state where the label printer is closed. FIG. 6 is an enlarged view of the front end portion in a state where the top cover is first closed from the state in FIG. 4. FIG. 7 is an enlarged view of the front end portion in a state where the label peel-off unit is first closed from the state in FIG. 4. FIG. 8 is an enlarged view of the front end portion in a state where the top cover is moved from a state in FIG. 7 to a position at which the top cover abuts against the label peel-off unit.

In order to perform printing by the label printer 1, the top cover 2 and the label peel-off unit 10 are moved to the second position and the fourth position respectively, which are closed positions, and the label printer 1 is in the state in FIG. 5.

At this time, in order to maintain the label 25 at an appropriate printing position, the top cover 2 is first moved to the second position (see FIG. 6). Thereafter, the label peel-off unit 10 is moved to the fourth position and is the state in FIG. 5. When operations are performed in this order, the interfering member supporting member 15 and the interfering member 16 are located at positions closer to the printer body 21 than the interfered member 10*a* and the interfered member 10*b* formed in the label peel-off unit 10, and thus are first located at the second position. Therefore, the interfered member 10*a* and the interfered member 10*b* do not interfere with the interfering member 16 in a process of moving the top cover 2 from the first position to the second position.

A case as in FIG. 7 where the label peel-off unit 10 is first moved to the fourth position will be described. If the top cover 2 is to be moved to the second position after the label peel-off unit 10 is moved from the state in FIG. 4 to the state in FIG. 7, the top cover 2 comes into the state in FIG. 8 before reaching the second position. In the state in FIG. 8, since the top cover 2 is moved to the second position, a force is applied to the interfering member 16 in a downward direction indicated by a dashed arrow in FIG. 8. On the other hand, a force from the interfering member 16 is applied to the interfered member 10*a* and the interfered member 10*b*, and the label peel-off unit 10 is pushed out in a left direction indicated by a solid arrow in FIG. 8. When the force from the interfering member 16 continues to be applied to the interfered member 10*a* and the interfered member 10*b*, the label peel-off unit 10 is pushed out to the third position.

Next, an operation for the label printer 1 to print a label will be described with reference to FIGS. 4 to 8.

First, an operation for appropriately peeling off the label 25 will be described.

As illustrated in FIG. 4 or FIGS. 2 and 3, the operator performs an operation for printing from a state where the top cover 2 and the label peel-off unit 10 are opened. At this time, if the label continuous body 27 is not contained in the printer body 21, the label continuous body 27 is contained in a state where the top cover 2 and the label peel-off unit 10 are opened. The operator pulls out the liner 26 by a length that allows the liner 26 to be inserted into the sheet discharge port 11 before the top cover 2 is moved to the second position. After performing the above operation, the operator moves the top cover 2 to the second position.

The operator places the liner 26 at a position along a label conveyance direction T. After inserting the liner 26 from the sheet discharge port 11 to an outside, the operator moves the label peel-off unit 10 to the fourth position while pulling the liner 26 pulled outside. By the above operations, printing can be performed while maintaining an angle necessary for the peeling bar 9 to appropriately bend the label 25 from the liner 26.

Next, a case where an incorrect operation that cannot appropriately peel off the label 25 is performed will be described. As illustrated in FIG. 4 or FIGS. 2 and 3, the operator performs an operation for printing from a state where the top cover 2 and the label peel-off unit 10 are opened.

First, a case where the interfering member supporting member 15 and the interfering member 16 are not provided in the top cover 2 and the interfered member 10*a* and the interfered member 10*b* are not provided in the label peel-off unit 10 as in the embodiment will be described. In this case, even if the top cover 2 is moved to the second position after the label peel-off unit 10 is moved to the fourth position, the interfering member supporting member 15, the interfering member 16, since the interfered member 10*a,* and the interfered member 10*b* for the top cover 2 to abut against the label peel-off unit 10 are not formed, the top cover 2 does not interfere with the label peel-off unit 10 even if the top cover 2 is moved to the second position. In such a case, since the liner 26 is sandwiched between the platen roller 18 and the nip roller 19 in a state where the label 25 and the liner 26 are not pressed between the thermal head 17 included in the top cover 2 and the platen roller 18, the liner 26 is deflected due to rigidity thereof, and thus does not abut against the peeling bar 9. In such a state, since the label 25 and the liner 26 are not placed at appropriate positions, the liner cannot be bent to an angle necessary for the peeling bar 9 to peel off the label, which leads to incomplete peeling. When the liner is conveyed to the sheet discharge port 11 in such a state, the label 25 sticks to an inner wall formed in a shape along a space formed between the nip roller 19, the label peel-off unit 10 and the printer body 21, and thus a conveyance failure occurs.

Next, a case where the label printer 1 performs an incorrect operation according to the embodiment will be described. As illustrated in FIG. 4 or FIGS. 2 and 3, the operator performs an operation for printing from a state where the top cover 2 and the label peel-off unit 10 are opened. First, when the label continuous body 27 is not contained in the printer body 21, the label continuous body 27 is contained in a state where the top cover 2 and the label peel-off unit 10 are opened. The operator pulls out the liner 26 to a length that allows the liner 26 to be inserted into the sheet discharge port 11 before the top cover 2 is moved to the second position. Next, after the liner 26 is inserted into the sheet discharge port 11, the operator moves the label peel-off unit 10 from the third position to the fourth position. The operator moves the top cover 2 from the first position to the fourth position. At this time, as illustrated in FIG. 8, the interfering member 16 connected to the interfering member supporting member 15 included in the top cover 2 abuts against the interfered member 10*a* and the interfered member 10*b* of the label peel-off unit 10, so that the top cover 2 interferes with the label peel-off unit 10, and the label peel-off unit 10 is automatically pushed out from the fourth position to the third position.

Since the interfering member 16 interferes with the interfered member 10*a* and the interfered member 10*b* of the label peel-off unit 10, even when an incorrect opening and closing order is used, occurrence of conveyance failure caused by inappropriately peeling off the label is reduced.

Second Embodiment

Figure 9:
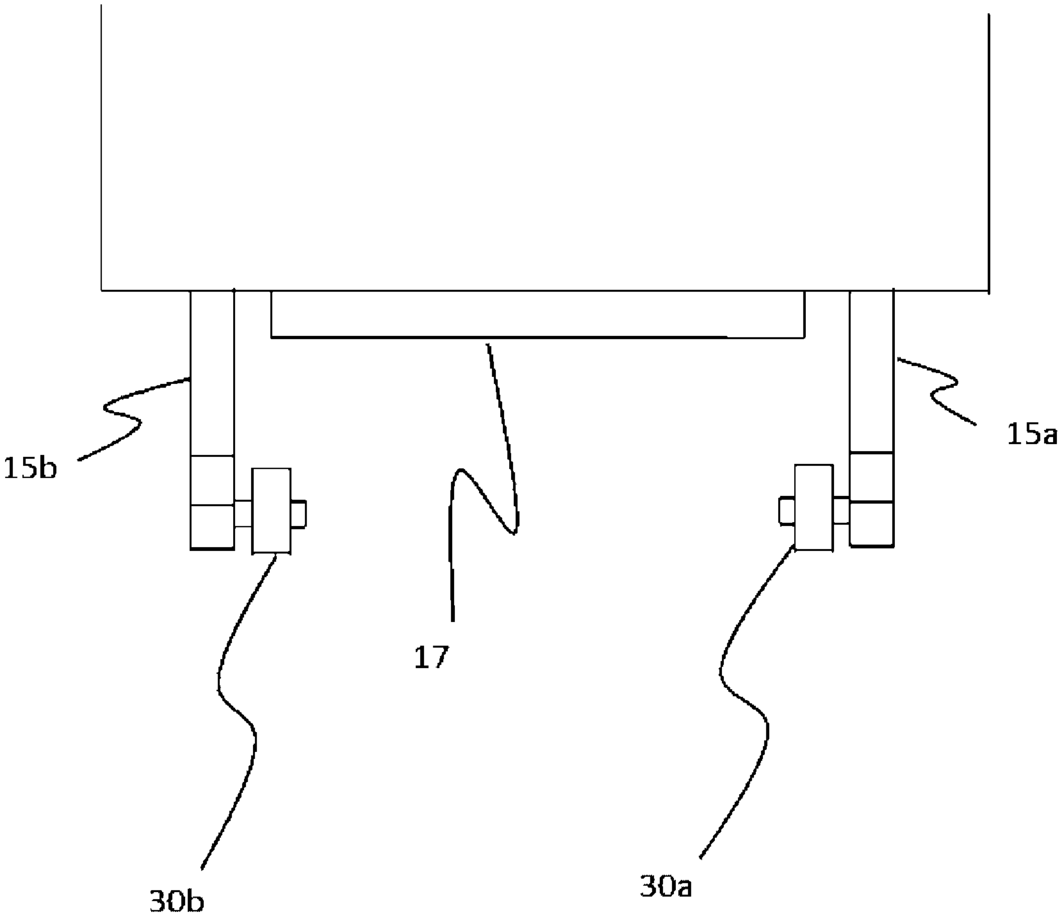
FIG. 9 is an enlarged front view of a front end portion of a top cover according to a second embodiment.

FIG. 9 is an enlarged front view of a front end portion of the top cover according to the second embodiment. The second embodiment is different from the first embodiment in that the second embodiment includes an interfering member 16 connected to the interfering member supporting member 15 and a rotatable rotary member 30.

In this configuration, the interfering member 16 includes a rotary shaft and a rotary member 30 that is rotatable about the rotary shaft. A rotary member 30*a* is connected to the interfering member supporting member 15*a* and a rotary member 30*b* is connected to the interfering member supporting member 15*b* respectively. In such a configuration as well, the interfering member supporting member 15 and the interfering member 16 can interfere with the interfered member 10*a* and the interfered member 10*b* via the rotary member 30. Since the rotary member 30 connected to the interfering member supporting member 15 is rotatable, friction generated between the interfering member 16 with the interfered member 10*a* and the interfered member 10*b* is small, and the label peel-off unit 10 is efficiently moved from the fourth position to the third position.

Further, the embodiment describes a configuration in which when the top cover 2 and the label peel-off unit 10 are to be moved from the open state to the closed state in order to perform a printing operation, the label peel-off unit 10 is automatically switched to the open state if the top cover 2 is moved to the position in the closed state in the state in which the label peel-off unit 10 is in the closed state.

In addition, when the label continuous body 27 is replaced, the label peel-off unit 10 is also automatically opened by opening the top cover 2 first. As illustrated in FIG. 5, the interfering member 16 that interferes with the label peel-off unit 10 is located at a position closer to the printer body 21 than the interfered member 10*a* and the interfered member 10*b,* and the interfered member 10*a* and the interfered member 10*b* are located on a track of the label peel-off unit 10 when the top cover 2 is opened. Therefore, when the top cover 2 is switched from the open state to the closed state and switched from the closed state to the open state, interference occurs.

According to at least one of the embodiments described above, even when the incorrect opening and closing order is used, an occurrence of conveyance failure caused by inappropriately peeling off the label is reduced. Exemplary embodiments described herein are not limited to the above embodiments, and various modifications can be made. The interfering member supporting member 15 and the interfering member 16 used in the first embodiment may be integrally molded. In addition, the interfering member 16 may be formed by fitting, for example, a rotatable ball instead of a protrusion or the like.

While certain embodiments are described, these embodiments are presented as examples and are not intended to limit the scope of the disclosure. These novel embodiments can be implemented in various other forms, and various omissions, substitutions, and modifications may be made without departing from the scope of the disclosure. These embodiments and modifications thereof are included in the scope and the gist of the disclosure and included in the inventions described in claims and the scope of equivalents of the inventions.

What is claimed is:

1. A label printer, comprising:

an under cover;

a top cover configured to move between a first position where the top cover is opened and a second position where the top cover is closed with respect to the under cover;

a label peel-off component located downstream in a label conveyance direction in the under cover and configured to move between a third position where the label peel-off component is opened and a fourth position where the label peel-off component is closed with respect to the under cover;

an interfering member supporting member provided on the top cover;

an interfering member configured to abut against an exterior member of the label peel-off component and connected to the interfering member supporting member; and an interfered member, which is a part of the exterior member of the label peel-off component, the interfered member protruding toward an upstream side in the label conveyance direction and being located at a position where the interfered member abuts against the interfering member when the top cover is in the second position and the label peel-off component is in the fourth position, wherein, when the top cover is moved from the first position to the second position, the label peel-off component is moved from the third position to the fourth position, and the interfering member does not interfere with the interfered member during a closing process, and wherein, when the label peel-off component moves from the third position to the fourth position, the top cover is moved from the first position to the second position, and the interfering member abuts against the interfered member during the closing process such that the top cover interferes with the label peel-off component, and the label peel-off component is pushed out from the fourth position to the third position.

2. The label printer according to claim 1, wherein the interfering member is located outside a sheet width of a label, and the interfered member is located outside the sheet width of the label.

3. The label printer according to claim 1, wherein the interfering member includes a member separate from the interfering member supporting member, and the interfered member includes a member separate from the label peel-off component.

4. The label printer according to claim 1, wherein the interfering member supports a rotary member configured to rotate.

5. The label printer according to claim 1, wherein the under cover is a rectangular parallelepiped case.

6. The label printer according to claim 1, wherein the under cover comprises a printer body.

7. The label printer according to claim 1, wherein

The top cover comprises a display unit and a control panel including operation buttons.

8. A label printer, comprising:

an under cover;

a top cover configured to move between a first position where the top cover is opened and a second position where the top cover is closed with respect to the under cover;

a label peel-off component located downstream in a label conveyance direction in the under cover and configured to move between a third position where the label peel-off component is opened and a fourth position where the label peel-off component is closed with respect to the under cover;

an interfering member including an inclined surface protruding toward a downstream side in the label conveyance direction provided in the top cover and configured to abut against an exterior member of the label peel-off component; and an interfered member, which is a part of the exterior member of the label peel-off component, the interfered member protruding toward an upstream side in the label conveyance direction and located at a position where the interfered member abuts against the interfering member when the top cover is in the second position and the label peel-off component is in the fourth position, wherein, when the top cover is moved from the first position to the second position, the label peel-off component is moved from the third position to the fourth position, and the interfering member does not interfere with the interfered member during a closing process, and wherein, when the label peel-off component moves from the third position to the fourth position, the top cover is moved from the first position to the second position, and the interfering member abuts against the interfered member during the closing process such that the top cover interferes with the label peel-off component, and the label peel-off component is pushed out from the fourth position to the third position.

9. The label printer according to claim 8, wherein the interfering member is located outside a sheet width of a label, and the interfered member is located outside the sheet width of the label.

10. The label printer according to claim 8, wherein the interfering member supports a rotary member configured to rotate.

11. The label printer according to claim 8, wherein the under cover is a rectangular parallelepiped case.

12. The label printer according to claim 8, wherein the under cover comprises a printer body.

13. The label printer according to claim 8, wherein

The top cover comprises a display unit and a control panel including operation buttons.

14. A label printer configured to print on a continuous label medium wound in a roll, comprising:

an under cover;

a top cover configured to move between a first position where the top cover is opened and a second position where the top cover is closed with respect to the under cover;

a label peel-off component located downstream in a label conveyance direction in the under cover and configured to move between a third position where the label peel-off component is opened and a fourth position where the label peel-off component is closed with respect to the under cover;

an interfering member supporting member provided on the top cover;

an interfering member configured to abut against an exterior member of the label peel-off component and connected to the interfering member supporting member; and an interfered member, which is a part of the exterior member of the label peel-off component, the interfered member protruding toward an upstream side in the label conveyance direction and being located at a position where the interfered member abuts against the interfering member when the top cover is in the second position and the label peel-off component is in the fourth position, wherein, when the top cover is moved from the first position to the second position, the label peel-off component is moved from the third position to the fourth position, and the interfering member does not interfere with the interfered member during a closing process, and wherein, when the label peel-off component moves from the third position to the fourth position, the top cover is moved from the first position to the second position, and the interfering member abuts against the interfered member during the closing process such that the top cover interferes with the label peel-off component, and the label peel-off component is pushed out from the fourth position to the third position.

15. The label printer according to claim 14, wherein the interfering member is located outside a sheet width of a label, and the interfered member is located outside the sheet width of the label.

16. The label printer according to claim 14, wherein the interfering member includes a member separate from the interfering member supporting member, and the interfered member includes a member separate from the label peel-off component.

17. The label printer according to claim 14, wherein the interfering member supports a rotary member configured to rotate.

18. The label printer according to claim 14, wherein the under cover is a rectangular parallelepiped case.

19. The label printer according to claim 14, wherein the under cover comprises a printer body.

20. The label printer according to claim 14, wherein

The top cover comprises a display unit and a control panel including operation buttons.

* * * * *